United States Patent
Bartak et al.

(10) Patent No.: US 11,538,115 B2
(45) Date of Patent: Dec. 27, 2022

(54) SYSTEMS AND METHODS FOR ADMINISTERING INDEX-LINKED FINANCIAL PRODUCTS

(71) Applicant: Innovation Design Group, LLC, Topeka, KS (US)

(72) Inventors: Christopher Bartak, Lawrence, KS (US); Jordan Canfield, Topeka, KS (US)

(73) Assignee: Innovation Design Group, LLC, Topeka, KS (US)

( * ) Notice: Subject to any disclaimer, the term of this patent is extended or adjusted under 35 U.S.C. 154(b) by 0 days.

(21) Appl. No.: 17/005,676

(22) Filed: Aug. 28, 2020

(65) Prior Publication Data

US 2021/0065308 A1   Mar. 4, 2021

Related U.S. Application Data

(60) Provisional application No. 62/893,907, filed on Aug. 30, 2019.

(51) Int. Cl.
| | |
|---|---|
| *G06Q 40/08* | (2012.01) |
| *G06Q 40/02* | (2012.01) |
| *G06Q 10/10* | (2012.01) |
| *G06F 16/23* | (2019.01) |
| *G06Q 40/04* | (2012.01) |
| *G06F 16/22* | (2019.01) |
| *G06F 16/26* | (2019.01) |
| *G06Q 50/18* | (2012.01) |

(52) U.S. Cl.
CPC ............ *G06Q 40/08* (2013.01); *G06F 16/22* (2019.01); *G06F 16/2379* (2019.01); *G06F 16/26* (2019.01); *G06Q 10/10* (2013.01); *G06Q 40/025* (2013.01); *G06Q 40/04* (2013.01); *G06Q 50/186* (2013.01)

(58) Field of Classification Search
CPC ....................................................... G06Q 40/08
USPC ............................................................ 705/4
See application file for complete search history.

(56) References Cited

U.S. PATENT DOCUMENTS

| | | | |
|---|---|---|---|
| 7,590,581 B1 | 9/2009 | Payne et al. | |
| 7,895,101 B1 | 2/2011 | Ferguson et al. | |
| 8,275,637 B1* | 9/2012 | Glacy, Jr. ............... | G06Q 40/08 705/26.1 |
| 8,275,689 B2 | 9/2012 | Ferguson et al. | |
| 8,374,941 B2 | 2/2013 | Payne et al. | |
| 8,504,470 B1* | 8/2013 | Chirehdast ............. | G06Q 40/02 705/38 |
| 8,660,943 B1* | 2/2014 | Chirehdast ............. | G06Q 40/00 705/38 |
| 8,682,700 B2 | 3/2014 | Ferguson et al. | |
| 2007/0100720 A1 | 5/2007 | Bonvouloir | |
| 2009/0099946 A1* | 4/2009 | Kelley ................... | G06Q 40/00 705/35 |
| 2011/0178907 A1 | 7/2011 | Ferguson et al. | |

(Continued)

OTHER PUBLICATIONS

"The False Allure of Equity Indexed Annuities" (Year: 2006).*
The false allure of equity indexed annuities IEEE (Year: 2012).*
The efficient market approximation IEEE (Year: 2006).*

*Primary Examiner* — Bruce I Ebersman
(74) *Attorney, Agent, or Firm* — Carlton Fields, PA

(57) ABSTRACT

This invention relates to a computer system for processing data related to fixed annuities and a crediting method.

11 Claims, 4 Drawing Sheets

(56) References Cited

U.S. PATENT DOCUMENTS

| | | | |
|---|---|---|---|
| 2013/0179196 A1* | 7/2013 | Brookman | G06Q 40/08 705/4 |
| 2013/0290155 A1* | 10/2013 | Wilson | G06Q 40/02 705/35 |
| 2015/0363885 A1* | 12/2015 | Leisher | G06Q 40/08 705/4 |
| 2020/0394709 A1* | 12/2020 | Celia | G06F 16/2379 |
| 2021/0065308 A1* | 3/2021 | Bartak | G06Q 40/08 |
| 2021/0342836 A1* | 11/2021 | Celia | H04L 67/12 |
| 2022/0198562 A1* | 6/2022 | Celia | G06Q 40/04 |

* cited by examiner

SYSTEMS AND METHODS FOR ADMINISTERING INDEX-LINKED FINANCIAL PRODUCTS

CROSS-REFERENCE TO RELATED APPLICATIONS

This application claims priority from, and incorporates by reference in its entirety, U.S. Provisional Patent Application Ser. No. 62/893,907, filed Aug. 30, 2019, entitled "Systems and Methods for Administering Index-Linked Financial Products."

FIELD OF THE INVENTION

This application relates to systems and methods for calculating performance, hedging liabilities, and displaying values for financial products.

BACKGROUND OF THE INVENTION

The present invention relates to computer systems and methods, and particularly to computer systems for use in the financial services field, and more particularly for processing of data related to fixed indexed annuities, variable indexed annuities, structured notes, market linked certificates of deposit, indexed universal life insurance products, structured payout mutual funds, and structured payout exchange traded funds.

Fixed annuities are contracts between an annuity owner and an issuing insurance company. In such annuities, an account is established with an initial account value or deposit, typically based on a premium paid by the annuity owner. On a periodic basis, amounts are credited to the account. In some fixed annuities, the amount credited is an interest rate on the account balance. In fixed index annuities, the amount credited, rather than being based on an interest rate determined by the insurance company or specified in the annuity contract, is based on an increase in a value of an index over a given time period.

For example, the index may be an index of equity securities, such as an index of stocks traded on one or more exchanges. If the value of the index declines during the time period, then the annuity account value remains the same. Thus, the owner of a fixed index annuity does not bear the risk of loss of annuity value as a result of loss of value of the index.

There are various ways to determine crediting. In one manner, called "point-to-point," the percentage change in index value is obtained between two dates, such as a current anniversary of the annuity contract and prior anniversary of the annuity contract. The percentage increase in index value is credited to the account, sometimes up to a percentage cap. The amount credited is in some products limited by a participation rate to a percentage of the gain. For example, in a fixed index annuity with a cap of 4% and a participation rate of 80%, a credit of 4% will be provided based on an index gain of 5% or greater between the two dates.

Certain fixed index annuities provide interest crediting based on a "performance trigger" strategy. In a performance trigger strategy, if the change in the index value between the two dates is zero or positive, then a pre-set interest credit percentage is applied. If the change in the index value between the two dates is negative, then there is no change in the index value. The interest credit percentage may be specified in the annuity contract, set at intervals by the issuing insurance company in its discretion, or set by the insurance company subject to limits, such as a minimum value, specified in the annuity contract.

Variables that can determine how much interest is credited may include participation rates, interest rate return caps, and spread fees. A "participation rate" determines how much of the linked index's gain will be used to calculate the interest earned. For example, if the participation rate is 90%, and the index increases 10%, the interest rate would be 9% (10× 0.9=9) over the applicable period. For a $1,000 investment, a gain of $90 would be seen. "Participation rates" vary across products.

Some fixed index annuities set a maximum rate of annual interest that the fixed index annuity will credit over a specified period. If a contract has an upper annual limit, or "cap," of 7%, for example, and the index linked to the annuity gained 7.2%, only 7% would be credited to the annuity for that year.

Some fixed index annuities have a "spread fee" instead of, or in addition to, the participation rate. The spread fee is a percentage that is subtracted from the index's gain. For example, if the spread fee is 2% and the index increases 8%, the interest rate credited would be 6% (8−2=6). If there is also a participation rate of 90%, the interest rate credited would be 5.4% ([8−2]×0.9=5.4).

Indexed annuities typically do not apply negative changes in an index to the contract value. Thus, if the change in index value is negative over the course of a crediting period, no deduction is taken from contract value nor is any index-based return credited.

Surrender charges are commonly deducted from withdrawals taken by an investor. The initial surrender charges, which may be as high as 10%-15%, are imposed on surrenders made during the early years of the contract and decline gradually to 0% at the end of a specified surrender charge period, which may be 10 to 15 years. Imposition of a surrender charge may have the effect of reducing or eliminating any index-based return credited to the investor up to the time of withdrawal. A surrender charge also could result in loss of principal, so an investor who surrenders prior to the end of the term may receive less than the original purchase amount.

Although existing structured products meet the needs of a segment of the investing population, there is a need for a system and method for efficiently calculating performance, hedging liabilities, and displaying values in connection with index-linked financial products. There is a further need for systems and methods that are capable of managing several different types of index-linked financial products, or products with complex anniversary structures, including products that have anniversaries other than annually.

BRIEF DESCRIPTION OF THE DRAWINGS

The invention is disclosed with reference to the accompanying drawings, wherein.

Corresponding reference characters indicate corresponding parts throughout the several views. The examples set out herein illustrate several embodiments of the invention but should not be construed as limiting the scope of the invention in any manner.

DETAILED DESCRIPTION

Figure 1:
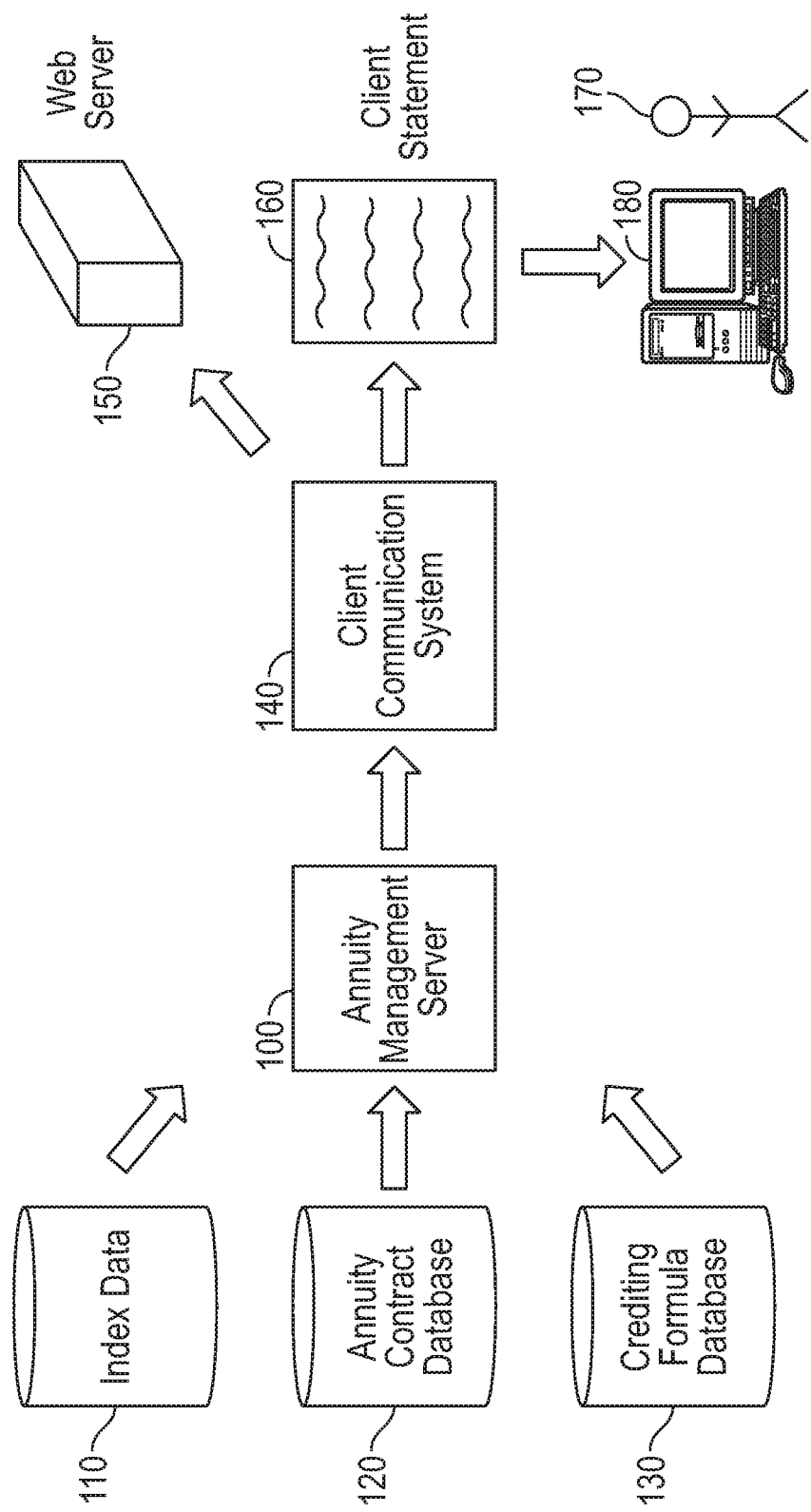
FIG. 1 is a schematic illustration of a computer system for processing data related to fixed annuities.

It is to be understood that the figures and descriptions of the present invention have been simplified to illustrate elements that are relevant for a clear understanding of the present invention, while eliminating, for the purpose of clarity, many other elements found in typical computer systems and methods for processing of data relating to annuities, including fixed annuities. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

In one embodiment, a system for processing data related to a fixed index annuity is configured to determine an amount for crediting to an account responsive to data. The system relates to processing data for a fixed index annuity contract between an insurance company and a contract owner. The system may be configured to provide for crediting the account only if the percentage change in an index is greater than a set threshold. By limiting crediting to those periods when the increase exceeds a threshold value, the insurance company avoids a need to pay interest based on typical levels of inflation, such as inflation levels of around 3% per year, while the investor is protected against higher than average inflation rates. The threshold value may be between 2% and 6%, for example. The threshold value may be set by the insurance company on a periodic basis, such as for each crediting period for each annuity, or may be fixed for an annuity term. The threshold value may be selected based on factors including a cost of options, or other derivatives purchased by the insurance company, which derivatives provide for payment by a counterparty to the insurance company based on price indexes, the payments increasing generally with greater price index increases. The threshold value may also be selected by the insurance company in its discretion upon selection by an annuity owner of the price index based crediting method for the next upcoming crediting period. In one example, the threshold may be in the range from 2% to 6%. The annuity contract may set a minimum base rate, and systems for implementing the invention may be configured to prevent a user from manually adjusting a base rate below a minimum base rate stored in a database and associated with the annuity contract.

A system may be configured to permit an owner of a fixed annuity to select one of several crediting methods for time periods during a term of the fixed annuity. For example, the system may be configured to determine crediting based on one of a point to point method with a cap based on an equity index, a performance trigger based on the equity index, a fixed rate, and an index-linked rate. The system may be configured to permit the owner to change the selected method of crediting on a periodic basis, such as on an annual basis or other time period.

Referring now to FIG. 1, an embodiment of a system for processing data related to fixed index annuities and configured to credit interest to the annuities based on an index-linked crediting strategy is shown. Annuity management server 100 is a computer system configured to receive and store data related to fixed index annuities and to process data related to fixed index annuities. Annuity management server 100 receives data relating to index performance from index database 110. Index database 110 is an exemplary database having data indicative of at least values of at least one equity index on a plurality of dates, including, for example, all business days for a time period and up to and including the immediate past business day. The index value may be the index value as reported by an index administrator, such as Standard & Poors for the S&P 500 equity index, as of a close of markets for each business day. Other indexes, such as the Dow Jones Industrial Average, various versions of the Wilshire 4500 Completion Index and Wilshire 5000 Total Market Index, and other U.S. market, other country market (e.g., the FTSE 100 Index for companies listed on the London Stock Exchange), multi-country indexes (e.g., the S&P Global 1200 Index), by way of example, may be used. Each index value is associated with a date. In one embodiment, the data indicative of the index value and associated date may be accessed, such as via an FTP server using suitable credentials, by annuity management server 100, or may be delivered on an automated basis via suitable data transfer protocols to annuity management server 100. The index value and date data may be delivered on a periodic basis and stored by annuity management server 100 in a local or remote data storage device, or may be accessed by annuity management server 100 on a real-time basis.

Annuity management server 100 may be a server configured to process and store data for a plurality of annuity contracts. As such, annuity management server 100 is configured to receive data relating to annuity contracts, including type of annuity, contract owner, death benefit formula, beneficiary of death benefits, premiums paid (including amount and date), annuity term, free withdrawal amounts or percentages and associated times, contract dates, market value adjustment formulas, surrender charges, and other types of data known and useful to those skill in the art. The stored data may further include a crediting strategy associated with each annuity during a time period. The available values of the crediting strategy may include, for example, a point-to-point method with a cap based on an equity index, a performance trigger based on the equity index, a fixed rate, a consumer price index linked rate, and an enhanced accumulation strategy according to an embodiment of the invention. The stored data associated with each of the annuities may further include periods for changing interest crediting strategies, and data indicative of formulas to determine and update account values.

Annuity management server 100 is further in communication with annuity contract database 120. Annuity contract database 120 may include data stored in local data storage devices associated with annuity management server 100, data storage devices in communication via a network, e.g. local area network (LAN) or wide area network (WAN) of the insurance company with annuity management server 100, or data stored in one or more third-party data storage devices accessible employing the cloud.

Exemplary data associated with a fixed index annuity contract in annuity contract database 120 include a contract identifier, a crediting strategy, a time period for crediting of interest, a contract anniversary date, a participation rate, a threshold value, a guaranteed rate to be applied if the threshold is not met, a multiplier, and an interest crediting floor, among others. The interest crediting period may be annual, or any other time period consistent with the index value.

The contract anniversary date may be a set date, such as the issue date of the contract or anniversaries other than annual. The contract anniversary is employed for determining, along with the interest crediting period, the dates of index values to be used in determining account crediting, along with the dates interest based on index values may be credited to the account.

Annuity management server 100 may be further in communication with crediting formula database 130. Crediting formula database 130 includes data indicative of formulas, for example, an index return formula, an interest crediting rate selection formula, and an interest crediting formula. Crediting formula database may be implemented as one or more spreadsheets incorporating formulas in a suitable format, such as formats compatible with the Microsoft Excel® spreadsheet software. In other embodiments, the formulas of the crediting formula database may be incorporated in computer program code executed by annuity management server 100. The formulas may be incorporated in modules of code that are called by a processor executing computer program code as needed. Annuity management server 100 is configured to access formulas from crediting formula database 130, populate the accessed formulas using data accessed from annuity contract database 120, and index database 110, and perform calculations to determine results of the accessed formulas, including crediting interest to fixed annuity account values.

Figure 2:
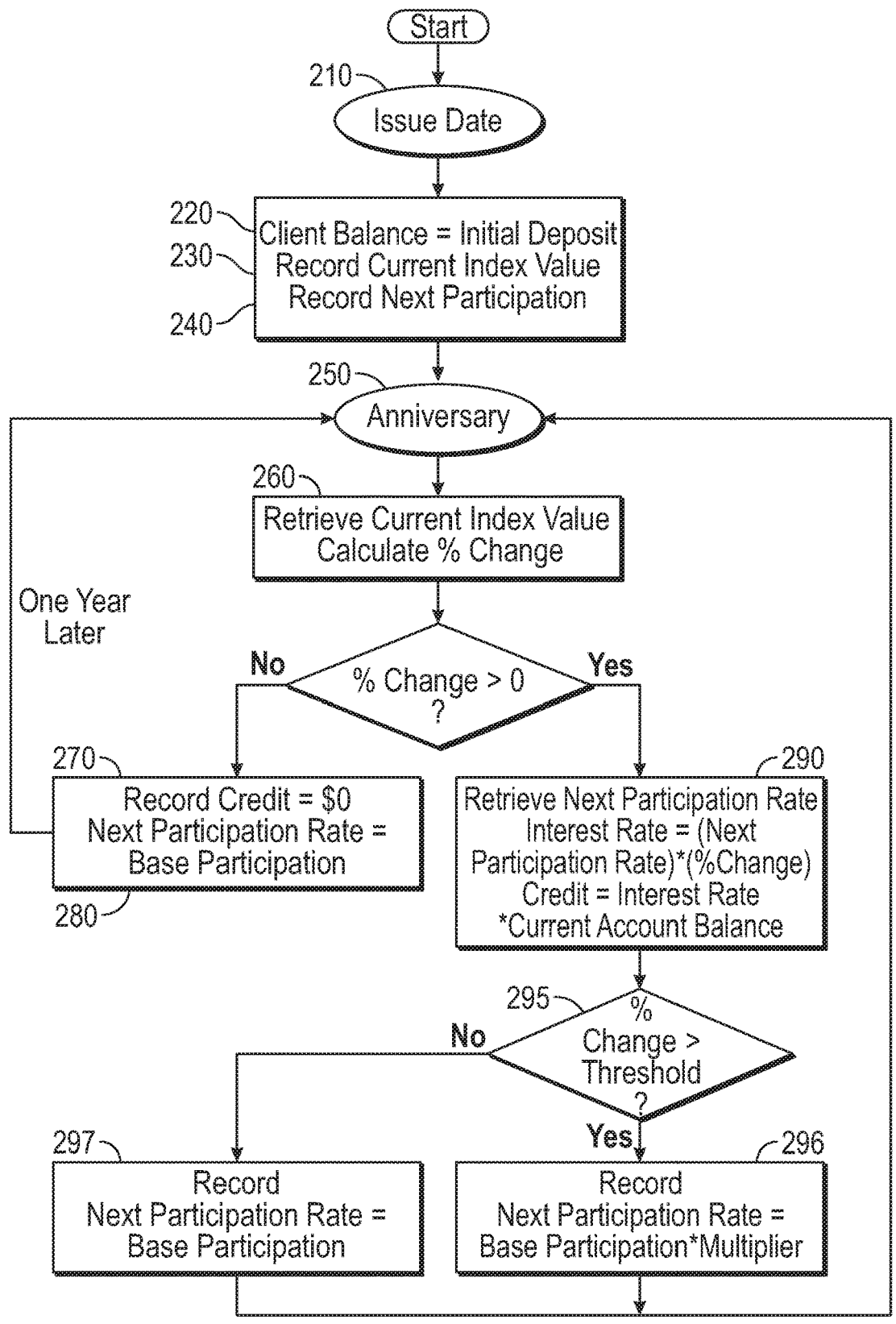
FIG. 2 is a process flow diagram of data processing steps performed by a computer system in an embodiment of a system of the invention.

In one embodiment, applying the crediting or index return formula may involve a first step of identifying the applicable base participation rate, then a threshold amount, and a multiplier. In one embodiment where the financial product is an exemplary fixed index annuity, the calculation would apply as illustrated in FIG. 2.

On the issue date 210 of the contract, the client's account balance is set in step 220 to their initial deposit. On this date, the initial index value is also determined in step 230, based on market data input from, for example, index database 110, and recorded by annuity management server 100 to a local or remote memory or to annuity contract database 120. The participation rate value is then stored in step 240 to be the "Base Participation" input.

One year later, on the anniversary date 250, the current index value is recorded again in step 260. The current and initial (or previous year's) index values are then compared and the percent change is calculated. If the current index value is less than or equal to the initial index value, in step 270 the client's interest rate then is set to 0% and $0.00 of interest is credited. Additionally, the next participation rate is set to the "Base Participation," in step 280.

If, however, the current index value is greater than the initial index value, the percentage change is calculated in step 290 using standard formulas. The client's interest rate is calculated as (next participation rate)*(percentage change). The amount credited to the account balance is calculated as (interest rate)*(current account balance). The percentage change in the index is then compared to the threshold amount in step 295. If the percent change is greater than or equal to the threshold, the next participation rate is set in step 296 as equal to (Base Participation)*(Multiplier). If the change is less than the threshold, the next participation rate is set in step 297 as the Base Participation.

The steps are repeated on all subsequent anniversaries. Interest is calculated based upon the participation set on the previous anniversary.

In another embodiment, a method of purchasing derivative financial instruments from an over-the-counter (OTC) counterparty to hedge the index-linked liability in the financial markets is provided. This hedging takes away the product providers' market risk, but ensures the assets purchased, and customer liabilities, react identically to index changes.

In one example, on the issue date of a subject financial product, a provider purchases "Z" contracts of a Call Option on the reference index, with a strike price set equal to the current value of the index ("at the money"). "Z" is calculated as (account balance)*(Base Participation)/current index value. The expiration date of the Call Option should be at the next anniversary. The price in dollars of this Call Option is "X." This X amount is recorded by the annuity management server 100, based on market offer prices. On the same day, X contracts of a Digital Call Option on the index are purchased, which pays off $1 if the index is up, otherwise $0. The strike price of this Digital Call is the current index value*(1+threshold amount). The expiration date of the Digital Call Option is set to be at the next anniversary.

On that anniversary, any payoff from the contracts opened on the issue date are collected. The payoff from the Call Option will be equivalent in dollars to the amount credited to the customer's account balance. To hedge the next anniversary's worth of interest, the following new positions are opened: Y contracts of "at the money" Call Options on the index are purchased, where Y is calculated as (participation rate for this anniversary)*(account balance after interest deposit)/index value. This purchase is recorded by the annuity management server 100, with cost "T." T units of a Digital Call Option are purchased, which pays off $1 if the index is above the strike. The strike is the current index value*(1+threshold amount). In one embodiment, both of these options have an expiration date of the subsequent anniversary. Upon all subsequent anniversaries, the prior step is repeated.

In one embodiment, anniversaries other than annual can be managed using the methods and systems described herein. For example, instead of the first anniversary occurring one year after the issue date 210, the anniversary could be any number of days after the issue date 210, including both shorter periods, e.g. 6 months, or a longer period, e.g., 3 years. In such embodiments, all of the interest credited is calculated per the method as described in FIG. 2, except the period of time that has elapsed between the current index value and initial (or previous) index value will be different depending on the "anniversary" date. The hedging steps described herein are also applicable, except the expiration dates on the Call Option and Digital Call Option will reflect the longer period of time between "anniversaries."

Other embodiments of the system are available. For example, instead of a multiplier, the next participation rate may be calculated as a function of the interest rate, and credited on an anniversary. In a further embodiment, the initial account balance deposited is equal to (1.0+a designated Bonus Rate)*Initial Premium, where the "Bonus Rate" is an additional declared feature as part of the financial product. The remaining steps in the process described in FIG. 2 remain the same, except with interest calculated on the higher account balance.

In yet a further embodiment, multiple indexes are used to calculate the percentage change that is used in calculating interest. In one embodiment, the index values (recorded in step 230) are based on a static blend of multiple different indexes. For example, a version with three indexes and weights of 40%, 30%, and 30%. The remaining calculation steps set forth in FIG. 2 remain the same, but the starting and ending index values would be a separate calculation based on these weights, calculated in this example as current index value=0.4*(index #1 current value)+0.3*(index #2 current value)+0.3*(index #3 current value). Alternatively, the index values recorded in step 230 are based on a dynamic blend of multiple different indexes.

In yet another embodiment, a charge is debited from the account balance, either unconditionally, or conditionally, based on the interest rate. In the unconditional embodiment, an additional calculation at contract issue (e.g., at step 210) and each anniversary is made, where a charge is calculated as a declared percentage of the current account balance. This charge is debited from the account balance before or after steps 270 or 290, as applicable. In the conditional embodiment, at each anniversary, a charge is calculated as a percentage of the account balance, but it is debited only if the interest is greater than a pre-determined threshold in step 290.

In a further embodiment, the hedging steps described herein occur when instruments are dynamically replicated using standard derivative approaches. As will be familiar to one of ordinary skill in the art, a "Call Option" can be dynamically replicated by purchasing shares in the underlying instrument directly, and buying/selling to manage exposure ("delta hedging"). In this embodiment, the hedging steps set forth herein are the same, but instead of purchasing Call Options from an over-the-counter counterparty, the financial product's issuer instead replicates the option on its own balance sheet using these approaches.

Continuing to refer to FIG. 1, the annuity management server 100 determines the credited amount, based on the interest crediting formula, and credits it to the account value, which is recorded in the annuity contract database 120. The credit may be reported by client communication system 140.

Client communication system 140 may include web server 150 and client statement generation system 160, and may be configured to generate printed and electronic messages, statements and reports. A user 170, such as an annuity owner or co-owner, annuitant, or broker or other financial advisor of an owner may, after suitable authentication, access data concerning the financial product via a networked user device. Web server 150 in turn fetches data related to the annuity associated with user 170 from annuity management server 100; renders the data in a suitable format, such as using appropriate html code; selects a suitable template; populates the template with suitable data and template images; and provides the suitable image for display on a device accessible by user 170 such as device 180.

The client communication system 140 may include client statement generation system 160 for, e.g., printing annuity statements, which statements are formatted to include data determined by annuity management server 100, such as contract number, owner name, anniversary date, account management value crediting strategy, crediting rates based on guaranteed rates or inflation index increases, crediting rates due to index performance (for time periods during which an equity index strategy has been selected by an annuity owner), credited amounts based on crediting rates, term, surrender charges and rates for surrender charges, premium amounts paid, and other data.

Figure 3:
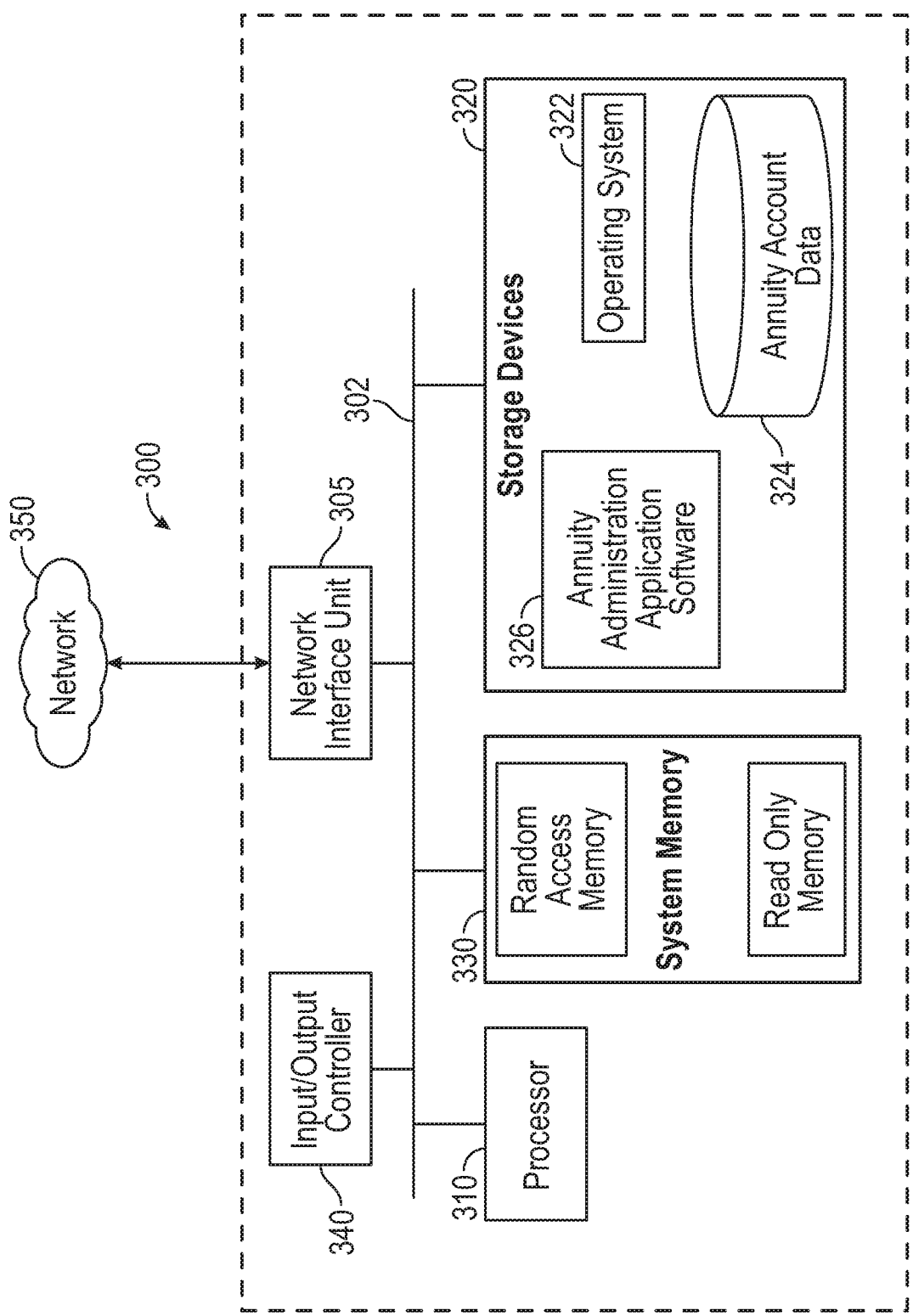
FIG. 3 is an illustration of system components in an implementation of a method and system of the invention.

Referring now to FIG. 3, an exemplary computer system 300 for use in an implementation of an embodiment of the invention will now be described. In computer system 300, processor 310 executes instructions contained in programs including annuity administration application software 326, stored in storage devices 320. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Application software 326 may include separate modules for such functions as prompting user 170, such as an insurance company employee, to input required data for: initial setup of a new annuity account, including selection of an initial index based or fixed rate crediting methodology, and to perform verification of completeness and consistency of provided information; assigning contract numbers to new annuity contracts; retrieving index data from index database 110; determining interest crediting based on index data; exchanging data with other systems, such as policy document generation systems, systems for administration of annuities during a payout phase, and other accounting systems; generating statements; furnishing data to printing and mailing systems, web servers and other systems for client communications such as client communication system 140; illustrating calculation and generation systems; processing of withdrawals, including calculation of surrender charges and market value adjustments; determination death benefits; and other functions. Storage devices 320 may include suitable non-transitory computer-readable media, such as optical or magnetic disks, fixed disks with magnetic storage (hard drives), flash memory, tapes accessed by tape drives, and other storage media.

Processor 310 communicates, such as through bus 302 and/or other data channels, with network interface unit 305, system memory 330, storage devices 320 and input/output controller 340. Via input/output controller 340, processor 310 may receive data from user 170 inputs such as pointing devices (including mice and trackballs), touch screens, audio inputs and keyboards, and may provide data to outputs, such as data to video drivers for formatting on displays, data to print drivers for transmission for printing in hard copy or to image files, and data to audio devices.

Storage devices 320 are configured to exchange data with processor 310, and may store programs containing processor-executable instructions, including instructions for implementing calculations employing algorithms, such as algorithms for determining interest crediting rates, and values of variables, such as index values and associated dates, dates of beginning and ending of crediting periods, threshold increase values, participation rates and base rates, for use by such programs.

Processor 310 is configured to perform steps in accordance with such processor-executable instructions. Processor 310 is configured to access data from storage devices 320, which may include connecting to storage devices 320 and obtaining data or reading data from the storage devices 320, or storing new and updated data into the storage devices 320. Storage devices 320 may include local and network accessible mass storage devices. Storage devices 320 may include media for storing operating system 322 and mass storage devices such as annuity account data storage device 324 for storing data related to annuities, account owners, beneficiaries, and the like. Such data may include data described with reference to annuity contract database 120 of FIG. 1, for example.

Still referring to FIG. 3, in an embodiment, inputs may include user interfaces, including workstations having keyboards, touch screens, pointing devices such as mice and trackballs, or other user input devices, connected via networked communications to processor 310. Network interface unit 305 may communicate via network 350 with other insurance computer systems, such as systems for generating payments of withdrawals, payments of death benefits, and administration of annuities during the payout phase.

Network interface unit 305 may further communicate with computer systems of the insurance company, such as client statement generation system 160 and web server 150, as well as computer systems of other entities, such as brokers and other financial advisers of annuity owners. Network interface units 305 further permit receipt via network 350 of index data from remote sources. Client statement generation system 160 may be configured with template forms, and receive or access data stored in annuity account data storage device 324 for creation of electronic and hard copy statements. The web server 150 may generate web documents for display on device 180, including data contained in reports, images of reports generated by client statement generation system 160, and other annuity-related data. In some embodiments, user 170 may send instructions via device 180, web server 150, and network interface unit 305 to cause computer system 300 to take action, such as processing withdrawals, calculating surrender charges, selecting crediting methodologies, and other actions.

In other embodiments, the functions of client statement generation system 160 may be incorporated in the functionality of computer system 300. Network 350 may be, or include, wired or wireless local area networks and wide area networks, and over communications between networks, including over the Internet. Any suitable data and communication protocols may be employed.

Figure 4:
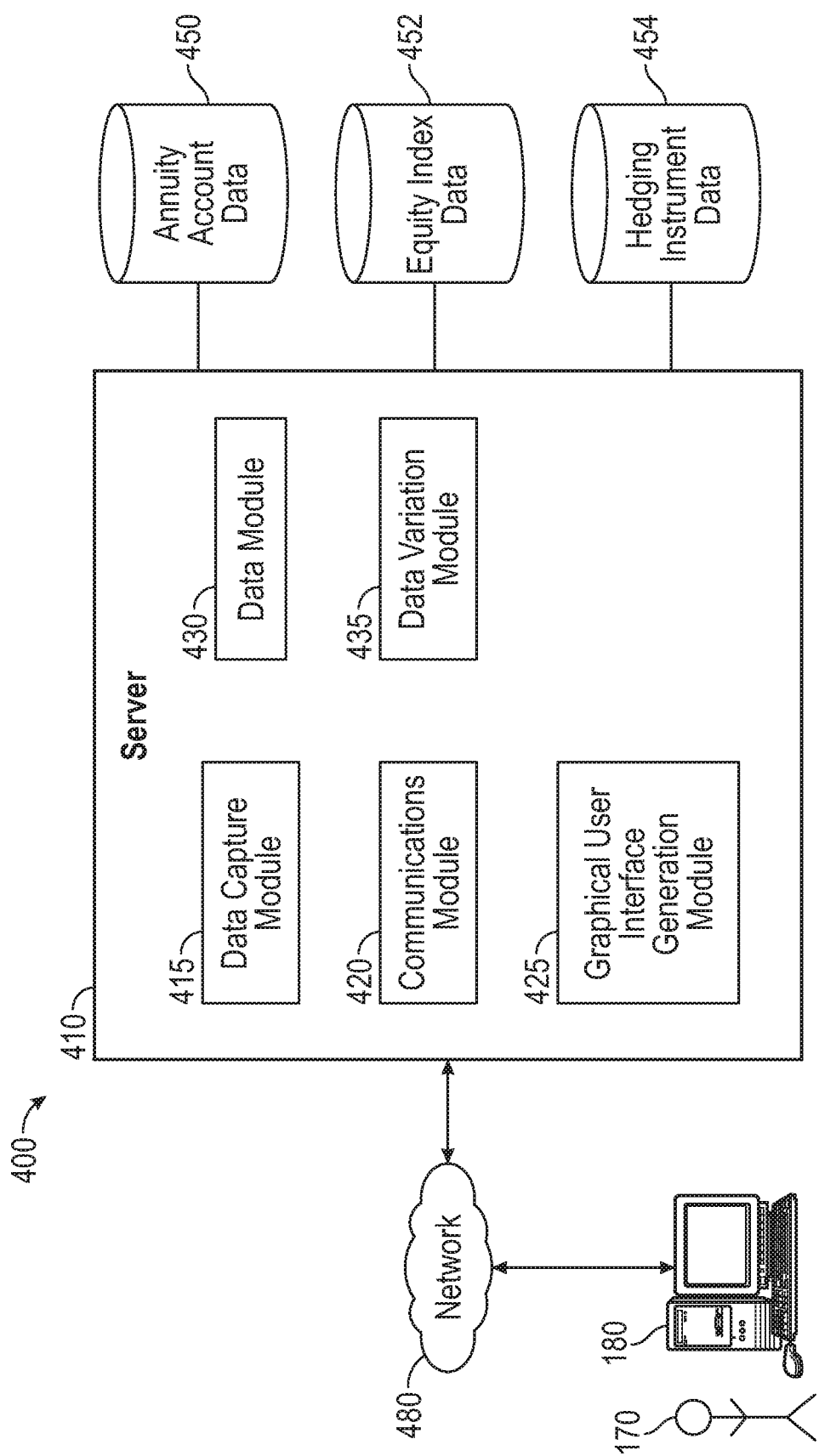
FIG. 4 is a schematic diagram of an exemplary computer system for implementation of a method and system of the invention.

Referring now to FIG. 4, another exemplary embodiment of a system 400 is shown. System 400 includes an server 410, which includes one or more engines or modules that may be utilized to perform one or more steps or functions of the various embodiments. In one embodiment, one or more modules of a computer software program in combination with one or more components of hardware are implemented. Such software programs may be used when a system user, such as an insurance company employee, or an annuity owner or representative, has sent a request for data or information to a server, and comprises part of the processing done on the server-side of the network. Such software programs may also operate, such as on a daily basis, to perform batch processing of data related to annuities. For example, a daily batch run may include identifying all annuity contracts that have reached a date for calculation of interest; calculating crediting rates; applying crediting rates to account values; and determining updated account values.

The programs may be used in an Internet environment, where the server is a web server and the request is formatted using HTTP (or HTTPS). Alternatively, the server may be in a corporate intranet, extranet, or any other type of network. Use of the term "Internet" herein, when discussing processing associated with the user's request, includes these other network environments, unless otherwise stated. Additionally, a graphical user interface or other module may be implemented as an intelligent hardware component incorporating circuitry including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. One or more functions of a web client or other module may be implemented as application software in the form of a set of processor-executable instructions stored in a memory of a user device, such as device 180, and capable of being accessed and executed by a processor of the user device.

Referring still to FIG. 4, server 410 includes a data capture or input/output module 415, a communications module 420, a display generation or graphical user interface module 425, a data module 430, and a data validation module 435, or any or all or some of these. Data module 430 may be in communication with a number of databases such as annuity account database 450, index database 452, and hedging instrument database 454. Databases 450, 452, and 454 may be implemented in one or more physical data storage devices in communication with server 410, or may be implemented in remote data storage devices accessible over one or more networks 480, such as cloud computer servers accessible via the Internet. Databases in communication with server 410 may include both internal and/or external/third-party databases. By way of example, external databases may include databases maintained by government agencies and commercial entities providing price index data, financial services data providers furnishing equity index value data, and financial services entities providing data relating to terms and prices of hedging instruments, such as options having payouts at future dates dependent on values of one or more consumer price indexes.

Server 410 may be configured for bulk upload of data, such as bulk upload of index data on a daily basis, for systems having annuities based on more than one index. Such data may be furnished such as via a spreadsheet file or via suitable xml documents, by way of example. Data may be exchanged between server 410 and one or more legacy systems via suitable middleware systems. One or more modules, such as data validation module 435, may be configured to perform data validation steps prior to storing bulk uploaded data. Server 410 may further be configured to permit bulk download of data, such as annuity data of clients of a broker or financial services retailer, to a device of suitably-authorized user.

In operation, server 410 is in communication with client devices, such as device 180, via network 480, which facilitates interaction with server 410 through one or more user interfaces including graphical user interfaces. As used herein, devices 180, may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Still referring still to FIG. 4, user 170, using device 180, such as an annuity owner or financial advisor, may view annuity data, and initiate annuity transactions, such as selection of crediting methods, withdrawals, premium payments and generation of printed statements. An application program running on device 180 may be further configured to prompt user 170 for available actions, such as generating forecasts of future account value based on various assumptions as to index returns and inflation; permitting instructions for withdrawals; permitting instructions for change of beneficiary; determining death benefit amounts based on a selected exemplary date of death of the owner; and other actions.

Data indicative of instructions input by user 170 on device 180 may be uploaded to server 410, which then may implement the instructions in accordance with processor-executable instructions. Alternatively, server 410 may be configured to generate data indicative of web documents for display on device 180, and to verify instructions prior to commencement of processing. Server 410 may further generate data for transmission to device 180, which is displayed by an application program to confirm that the instruction has been received and is being implemented. Server 410 may be configured to confirm such activities in other manners, such as by sending electronic e-mail or text messages, sending instructions for printing and mailing of physical letters to account owners, and other suitable methods.

By way of further example, server 410 may be configured to generate and display administration system screens on device 180 to user 170, such as an employee of the insurance company. The administrative system may show owner, annuitant, beneficiary and broker information, as stored in annuity account database 450, for an insurance company employee to review, verify or update, such as on issuing of a new annuity, or in response to a telephone inquiry from an annuity owner or broker.

User 170, such as an employee of an insurance company having administrative responsibilities, may access further data and provide updates and modifications to data, such as guaranteed rate data that the insurance company is contractually permitted to change. Other data that the insurance company may be contractually-permitted to change and that may be updated by user 170 may include fixed rates, threshold rates, and participation rates, by way of example. Such user 170 may further be able to implement updates to processing logic.

In embodiments of the present invention, one or more of the above modules, may also be implemented in combinations of software and hardware for execution by various types of computer processors coupled to such hardware.

As used herein, a module of executable code may, for instance, comprise one or more physical or logical blocks of computer instructions which may, for instance, be organized as an object, procedure, process or function. Nevertheless, the executables of an identified module need not be physically located together, but may comprise separate instructions stored in different locations which, when joined logically together, define the module and achieve the stated purpose for the module such as implementing the determination of amounts to be credited to an fixed annuity account responsive to receipt of data indicative of consumer price index value changes, as well as other business rules logic prescribed by the present system. In embodiments of the present invention, a module of executable code may be a compilation of many instructions, and may be distributed over two or more different code partitions or segments, among different programs, and across two or more devices. Similarly, data, including by way of example annuity data, index data, and hedging instrument data, may be identified and illustrated herein within modules, and may be embodied in any suitable form and organized within any suitable type of data structure. Such data may be collected as a single data set, or may be distributed over different locations including over different storage devices, and may exist, at least partially, merely as electronic signals on a system and/or network as shown and described herein.

A processor may provide the central processing unit (CPU) functions of a computing device on one or more integrated circuits. The term "processor" may include multi-core processors and central processing units including multiple microprocessors. The central processing unit functionality may be provided at one or more remote locations, such as through application service provider and cloud computing services.

In embodiments, a processor may provide an output signal having data indicative of one or more data items. An output signal may be carried either over a suitable medium, such as wire or fiber, or wirelessly. An output signal may transmit data from one device to another directly, such as over a bus of a computer system from a processor to a memory device, or indirectly, such as over multiple networks, and with intermediate steps of storage in a buffer or memory device and retransmission. Such an output signal may be provided by the processor to a bus of a computer system together with address data at a series of clock intervals. The address data may designate a destination device on a bus, by way of example. In embodiments, an output signal may be a signal output from a hardware communications device of a computer system to a network, such as a local area network, a wide area network, or a network of interconnected networks, such as the Internet. Output signals may include, by way of example, data identifying formats, fields, and content of fields. Signals may be compatible with any appropriate format. For example, data may be formatted in accordance with a data format for insurance data, such as an ACORD compatible format, or a non-ACORD xml format. Reference to an output signal having particular data may include one or more signals bearing the information. Multiple signals bearing the information may include sequences of digital data bearing the information interleaved with sequences of digital data relating to other information. By way of example, a signal may be packetized for transmission. By way of further example, an output signal may take the form of an uncompressed digital signal or a compressed digital signal.

A system on which the methods of embodiments of the present invention may be implemented includes at least one central processing computer or computer network server. A network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server. The network server may be configured in many different ways. For example, a network server may be a standalone server computer or alternatively, the functions of a network server may be distributed across multiple computing systems and architectures.

A network server may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP.

Data storage device may include hard magnetic disk drives, optical storage units, CD-ROM drives, or flash memory, by way of example. Data storage devices contain databases used in processing calculations embodied in algorithms, including data for display on client devices and data for determination of crediting rates and changes to annuity account values. In one embodiment, database software creates and manages these databases. Annuity and insurance related calculations and/or algorithms in accordance with an embodiment of the present invention may be stored in storage devices and accessed and executed by a processor.

Suitable computer program code may be provided for performing numerous functions such as producing reports for review by insurance company personnel and auditors indicative of amounts credited to annuities based on inflation indexes, data relating to options purchased by the insurance company to fund the guaranteed credits, and other functions. The functions described above are merely exemplary and should not be considered exhaustive of the type of function which may be performed by the computer program code of embodiments of the present inventions.

The computer program code required to implement the above functions (and the other functions described herein) can be developed by a person of ordinary skill in the art, and is not described in detail herein.

The annuity management server 100 described herein may be in communication with systems including payment systems for effecting payments of withdrawals to users 170, e.g., account owners. The annuity management server 100 may further be in communication with a server for administration of annuities during the payout phase, such that upon receipt of data indicative of an owner decision to annuitize, relevant data, such as current account value, can be transmitted to the server for management during the payout phase for determination of a payout rate and determination, using the payout rate, the applicable payment period (single life, joint life, term of years, single life with a minimum term of years, or other period), demographic data as to annuitants, such as age and gender, at least for life terms, payment frequency (annual, quarterly, monthly or other), the account value, and any surrender charges or market value adjustments, the amount of each payment during the payout period can be determined.

The term "computer-readable medium" as used herein refers to any medium that provides or participates in providing instructions to the processor of the computing device (or any other processor of a device described herein) for execution. Such a medium may take many forms, including but not limited to, non-volatile media, non-transitory media, tangible media, volatile media, and transmission media. Non-volatile media and tangible media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of embodiments of the present invention may also interact and/or control one or more user devices or terminals. The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc.).

While particular embodiments of the invention have been illustrated and described, various modifications and combinations can be made without departing from the spirit and scope of the invention, and all such modifications, combinations, and equivalents are intended to be covered and claimed.

The foregoing is intended to provide a brief, general description of an illustrative and/or suitable exemplary environment in which embodiments of the described present invention may be implemented. This is exemplary of a suitable environment and not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

The embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated that the embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

We claim:

1. A system for processing data related to fixed index annuities and crediting interest to a user account based on an index-linked crediting strategy, comprising:
   an annuity management server configured to:
      receive index performance data over a network from at least one equity index administrator, wherein the index performance data comprises values of at least one equity index on a plurality of dates;
      store index performance data from at least one equity index administrator in an index database;
      receive index performance data from the index database;
      receive annuity contract data relating to a plurality of annuity contracts, wherein said annuity contract data comprises data indicating type of annuity, contract owner, death benefit formula, beneficiary of death benefits, premiums paid, annuity term, free withdrawal amounts or percentages and associated times, contract date, market value adjustment formulas, changing interest strategies, and surrender charges;
      store annuity contract data in an annuity contract database;
      receive annuity contract data from the annuity contract database;
      receive fixed index annuity crediting data comprising a contract identifier,
   a crediting strategy, a time period for crediting of interest, a contract anniversary date, a participation rate, a threshold value, a guaranteed rate to be applied if the threshold value is not met, a multiplier, and an interest crediting floor;
      store annuity crediting data in the annuity contract database;
      receive annuity contract data from the annuity contract database;
      receive a crediting strategy associated with each of the plurality of annuity contracts;
      access crediting formulas from a crediting formula database, wherein said crediting formula database comprises an index return formula, an interest crediting rate selection formula, and an interest crediting formula;
      populate the accessed crediting formulas using data received from the annuity contract database and index database, wherein the data received from the annuity contract database comprises a base participation rate, a threshold amount, and a multiplier and the data received from the index database and used in populating the accessed crediting formulas comprises a static or dynamic blend of a plurality of equity indexes;
      perform calculations to determine the results of the accessed formulas, including the amount of crediting interest;
      crediting interest to a user account based on the results of the crediting formula; and
   a client communication system comprising:
      a client statement generation system comprising a printer operable to print annuity statements, wherein annuity statements are formatted to include data comprising at least one of a contract number, a client name, an anniversary date, an account management value, the crediting strategy, a term, surrender charges, and premium amounts paid; and
      a web server configured to:
         communicate with a user device over a network
         retrieve data comprising at least one of a contract number, a client name, an anniversary date, an account management value, the crediting strategy, a term, surrender charges, and premium amounts paid from the annuity management server related to a user;
         render the data in a suitable format;
         select a template;
         populate the template with the data and template images; and
         provide an image for display on the user device, wherein the image comprises the populated template.

2. The system of claim 1, wherein the annuity contract data comprises periods for changing interest crediting strategies.

3. The system of claim 1, wherein the annuity contract data comprises data indicative of formulas to determine and update account values.

4. The system of claim 1, wherein the contract anniversary date is a contract's issue date.

5. The system of claim 1, wherein the contract anniversary date is set to an anniversary date other than an anniversary of a contract's issue date.

6. The system of claim 1, wherein the index performance data comprises values for a plurality of equity indexes on a plurality of dates.

7. A method for processing data related to annuities and crediting interest to a user account based on an index-linked crediting strategy, comprising:
   an annuity management server
      receiving index performance data over a network from at least one equity index administrator, wherein the index performance data comprises values of at least one equity index on a plurality of dates;
      the annuity management server storing index performance data from at least one equity index administrator in an index database;
      the annuity management server receiving index performance data relating to index performance from the index database comprising a static or dynamic blend of a plurality of equity indexes, wherein the index database stores data indicative of values of at least one equity index on a plurality of dates as reported by an index administrator;

the annuity management server receiving annuity contract data relating to a plurality of annuity contracts, wherein said annuity contract data comprises data indicating type of annuity, contract owner, death benefit formula, beneficiary of death benefits, premiums paid, annuity term, free withdrawal amounts or percentages and associated times, contract date, market value adjustment formulas, interest crediting strategies, and surrender charges;

storing annuity contract data in an annuity contract database;

receiving annuity contract data from the annuity contract database;

the annuity management server receiving fixed index annuity crediting data comprising a contract identifier, a crediting strategy, a time period for crediting of interest, a contract anniversary date, a participation rate, a threshold value, a guaranteed rate to be applied if the threshold value is not met, a multiplier, and an interest crediting floor;

the annuity management server storing annuity crediting data in the annuity contract database;

the annuity management server receiving annuity contract data from the annuity contract database;

the annuity management server receiving a crediting strategy associated with each of the plurality of annuity contracts;

the annuity management server accessing crediting formulas from a crediting formula database, wherein said crediting formula database comprises an index return formula, an interest crediting rate selection formula, and an interest crediting formula;

the annuity management server populating the accessed crediting formulas using data received from the annuity contract database and index database, wherein the data received from the annuity contract database includes a base participation rate, a threshold amount, and a multiplier and the data received from the index database and used in populating the accessed crediting formulas comprises a static or dynamic blend of a plurality of equity indexes;

the annuity management server performing calculations to determine the results of the accessed formulas, including the amount of crediting interest;

the annuity management server crediting interest to the a user account based on the results of the crediting formula;

a client statement generation system comprising a printer printing annuity statements, wherein annuity statements are formatted to include data comprising at least one of a contract number, a client name, an anniversary date, an account management value, the crediting strategy, a term, surrender charges, and premium amounts paid; and a web server
communicating with a user device over a network
the web server retrieving data comprising at least one of a contract number, a client name, an anniversary date, an account management value, the crediting strategy, a term, surrender charges, and premium amounts paid from the annuity management server related to a user;
the web server rendering the data in a suitable format;
the web server selecting a template;
the web server populating the template with the data and template images; and
the web server providing an image for display on the user device, wherein the image comprises the populated template.

8. The method of claim 7, wherein the annuity contract data comprises data indicative of formulas to determine and update account values.

9. The method of claim 7, wherein the contract anniversary date is a contract's issue date.

10. The method of claim 7, wherein the contract anniversary date is set to an anniversary date other than an anniversary of a contract's issue date.

11. The method of claim 7, wherein the index performance data comprises values for a plurality of equity indexes on a plurality of dates.

* * * * *